United States Patent
Joung et al.

(10) Patent No.: US 9,219,773 B2
(45) Date of Patent: Dec. 22, 2015

(54) METHOD OF MEASURING CALL DELAY TIME

(71) Applicant: INNOWIRELESS CO., LTD., Gyeonggi-do (KR)

(72) Inventors: Jin Soup Joung, Gyeonggi-do (KR); Kyeong Min Ha, Gyeonggi-do (KR); Jong Min Kim, Gyeonggi-do (KR); Sung Lyong Lim, Gyeonggi-do (KR); Seung Yeup Chae, Gyeonggi-do (KR)

(73) Assignee: INNOWIRELESS CO., LTD. (KR)

( * ) Notice: Subject to any disclaimer, the term of this patent is extended or adjusted under 35 U.S.C. 154(b) by 0 days.

(21) Appl. No.: 14/471,891

(22) Filed: Aug. 28, 2014

(65) Prior Publication Data

US 2015/0065094 A1 Mar. 5, 2015

(30) Foreign Application Priority Data

Aug. 29, 2013 (KR) .................. 10-2013-0103421

(51) Int. Cl.
| | | |
|---|---|---|
| *H04L 12/58* | (2006.01) | |
| *H04B 3/46* | (2015.01) | |
| *H04L 29/06* | (2006.01) | |
| *H04L 12/26* | (2006.01) | |
| *H04M 3/00* | (2006.01) | |

(52) U.S. Cl.
CPC .............. *H04L 65/80* (2013.01); *H04L 43/00* (2013.01); *H04M 3/00* (2013.01)

(58) Field of Classification Search
CPC .............. H04M 2201/14; H04L 43/00; H04L 65/1046; H04L 47/28; H04W 76/02; H04W 64/00; H04W 72/00; H04W 16/22

USPC ..................................... 455/412.1; 375/224
See application file for complete search history.

(56) References Cited

U.S. PATENT DOCUMENTS

| | | | | |
|---|---|---|---|---|
| 6,314,174 | B1 * | 11/2001 | Furutono ............... | H04L 47/10 370/397 |
| 6,795,395 | B1 * | 9/2004 | Khasnabish .......... | H04M 3/323 370/230 |
| 2005/0208979 | A1 * | 9/2005 | Kim ....................... | H04N 7/152 455/566 |
| 2010/0057521 | A1 * | 3/2010 | Jordan ................... | G06Q 10/06 704/7.11 |
| 2013/0263231 | A1 * | 10/2013 | Lautenschlager ... | H04L 63/0861 726/4 |

* cited by examiner

*Primary Examiner* — Don N Vo

(74) *Attorney, Agent, or Firm* — Kaplan Breyer Schwarz & Ottesen, LLP

(57) ABSTRACT

A method of measuring a call delay time by synchronizing times of a replaying part and a recording part in a call delay time measuring device using an interrupting hardware method. The method includes reading an original WAV file when a replaying CPU receives a command, waiting for writing to a DAC buffer of a replaying CODEC, transferring a signal of recording-ready to a recording CPU, generating a recording WAV file by the recording CPU, waiting for reading from an ADC buffer of a recording CODEC, transferring a signal of complete recording-ready to the replaying CPU, recording the original WAV file, replaying the original WAV file and simultaneously transferring a signal of recording-start to the recording CPU, and reading audio data from the ADC buffer of the recording part by the recording CPU and recording the audio data to the recording WAV file.

3 Claims, 2 Drawing Sheets

METHOD OF MEASURING CALL DELAY TIME

CROSS-REFERENCE TO RELATED APPLICATION

This application claims priority to and the benefit of Korean Patent Application No. 10-2013-0103421, filed on Aug. 29, 2013, the disclosure of which is incorporated herein by reference in its entirety.

FIELD OF THE INVENTION

The embodiment of the present invention relates to a method of measuring a call delay time, and specifically, to a method of measuring a call delay time in a state of synchronizing times of a replaying part and a recording part in a call delay time measuring device by an interrupting hardware method.

BACKGROUND OF THE INVENTION

As for mobile communication terminal manufacturers, they need to determine an actual call voice quality of their manufactured terminal for manufacturing a high quality terminal. As for mobile communications carriers, they also need to determine an actual call voice quality for a purpose of an optimization by checking a performance or a state of self-managing and self-maintaining a mobile communications network. Mean opinion score (MOS) is proposed as a method of measuring the above-described call voice quality.

The MOS is a subjective method of measuring a sound quality evaluated in 5 different ratings as shown in Table 1 by scoring satisfaction scales from users and then finding an average value while having multiple users hearing an actual call voice

TABLE 1

| MOS Value | Quality Rating |
| --- | --- |
| 5 | Excellent |
| 4 | Good |
| 3 | Fair |
| 2 | Poor |
| 1 | Bad |

As described above, since the MOS measuring method having a lack of objectivity and a high measuring cost is a subjective measuring method by a user, automated and objectified methods are preferred recently, which are specifically the perceptual speech quality measurement (PSQM) algorithm defined on P.861 of the ITU-T and a perceptual evaluation of speech quality (PESQ) standard as an algorithm defined on P.862 based on the PSQM algorithm for corresponding to a packet loss or the like.

Meanwhile, as a Voice over IP (VoIP) or Voice over LTE (VoLTE) is being commercialized, audio data is also transmitted in a packet form. Every packet is not always sequentially transferred to a destination due to a characteristic of a packet switching network and a delay frequently occurs based on a network environment. Thus, the delay has emerged as a very important item in an MOS measurement of VoIP or VoLTE system.

In accordance with an embodiment of the conventional method, the MOS measuring device has at least two ports in which an original audio file, for example an original WAV file, is replayed through one port, and an audio file received through an IP network or LTE network is recorded through another port while connecting each of the mobile communication terminals to the MOS measuring device, and a CPU for a control and a CODEC are included in each port. Meanwhile, each port is connected to a data pin and an audio jack of the mobile communication terminal through a USB cable and an audio cable. In this case, a host program for a control of the CODEC included in each port, that is, for a control of replaying and recording the original WAV file, is loaded in the mobile communication terminal.

Hereinafter, the ports used for the replaying and the recording are referred to as a "replaying part" and a "recording part" for the sake of convenience, respectively, and the mobile communication terminals used for the replaying and the recording are referred to as a "replaying terminal" and a "recording terminal", respectively.

In a conventional MOS measuring device having the above-described configuration, when an original WAV file is replayed and output to the replaying terminal through the CODEC of the replaying part, the audio signal is received in a packet form through an IP network or LTE network by the recording terminal connected to the recording part. The audio signal received by the recording terminal is recorded after decoding through the CODEC included in the recording part and comparing with the original WAV file, and then used in measuring a call quality, a call delay time, or the like.

According to the above-described conventional MOS measuring device, while an operator executes a host program of the replaying terminal and the recording terminal, the MOS measurement is eventually started by manually pressing a "replay" button through the replaying terminal and manually pressing a "record" button through the recording terminal at the same time.

However, according to a synchronizing method by the conventional manual operation as described above, since simultaneously pressing the "replay" button and the "record" button within a time range of tens of milliseconds is difficult, measurement of the actual call delay time is difficult. In addition, since measured values differ by operator or every measuring time, there is a problem in which measurement reliability is degraded.

SUMMARY OF THE INVENTION

The present invention is directed to providing a method of measuring a call delay time which may accurately measure by synchronizing times of a replaying part and a recording part in a call delay time measuring device using a method of interrupting hardware and improve a degree of measurement reliability.

One aspect of the present invention provides a method of measuring a call delay time wherein the measuring of the call delay time is performed by a call delay time measuring device including CPUs and CODECs, connecting the CPUs with a ready interrupt signal line and a starting interrupt signal line, and having at least two ports respectively serving as a replaying part and a recording part, and the method of measuring the call delay time includes reading an original WAV file when the replaying part CPU receives a delay measuring command, waiting for writing to a DAC buffer of a replaying part CODEC, and transferring an interrupt signal of recording-ready to a recording part CPU through the ready interrupt signal line, generating a recording WAV file by the recording part CPU, waiting for reading from an ADC buffer of a recording part CODEC, and transferring an interrupt signal of complete recording-ready to the replaying part CPU through a ready interrupt signal line, recording the original WAV file read by the replaying part CPU to the DAC buffer of the replaying part CODEC, replaying the original WAV file and simultaneously transferring an interrupt signal of recording-start to the recording part CPU through the starting interrupt signal line, and reading audio data from the ADC buffer of the recording part CODEC by the recording part CPU and recording the audio data to the recording WAV file.

In the embodiment, the delay measuring command is transferred from a host program loaded in the replaying terminal.

The recording part CPU receives the interrupt signal of recording-start and transfers a message of receiving the interrupt signal to the recording terminal, and the recording terminal calculates the call delay time through the host program by subtracting a received time of the message of receiving the signal from a generated time of the recording WAV file.

In accordance with the embodiment of the invention, the method of measuring the call delay time synchronizes the replaying part and the recording part of the call delay time measuring device using an interrupting hardware method and measures the call delay time, thereby a measurement error is dramatically reduced and a measurement error generated from every operator or measurement can also be eliminated.

Furthermore, time spent on a ready process of replaying, that is, the ready process until recording to a DAC buffer of a CODEC of reading data from the original WAV file and a ready process of recording, in other words, the ready process until reading data from the DAC buffer of the CODEC of generating a recording WAV file, are excluded from the measurement of the call delay time, thereby an actual call delay time in an IP network or LTE network can be measured more accurately.

BRIEF DESCRIPTION OF THE DRAWINGS

The above and other objects, features and advantages of the present invention will become more apparent to those of ordinary skill in the art by describing in detail exemplary embodiments thereof with reference to the accompanying drawings, in which.

DETAILED DESCRIPTION

Exemplary embodiments of the present invention will be described in detail below with reference to the accompanying drawings. While the present invention is shown and described in connection with exemplary embodiments thereof, it will be apparent to those skilled in the art that various modifications can be made without departing from the spirit and scope of the invention.

Hereinafter, referring to attached views, an exemplary embodiment of the present invention which relates to a method of measuring call delay time will be illustrated in detail.

Figure 1:
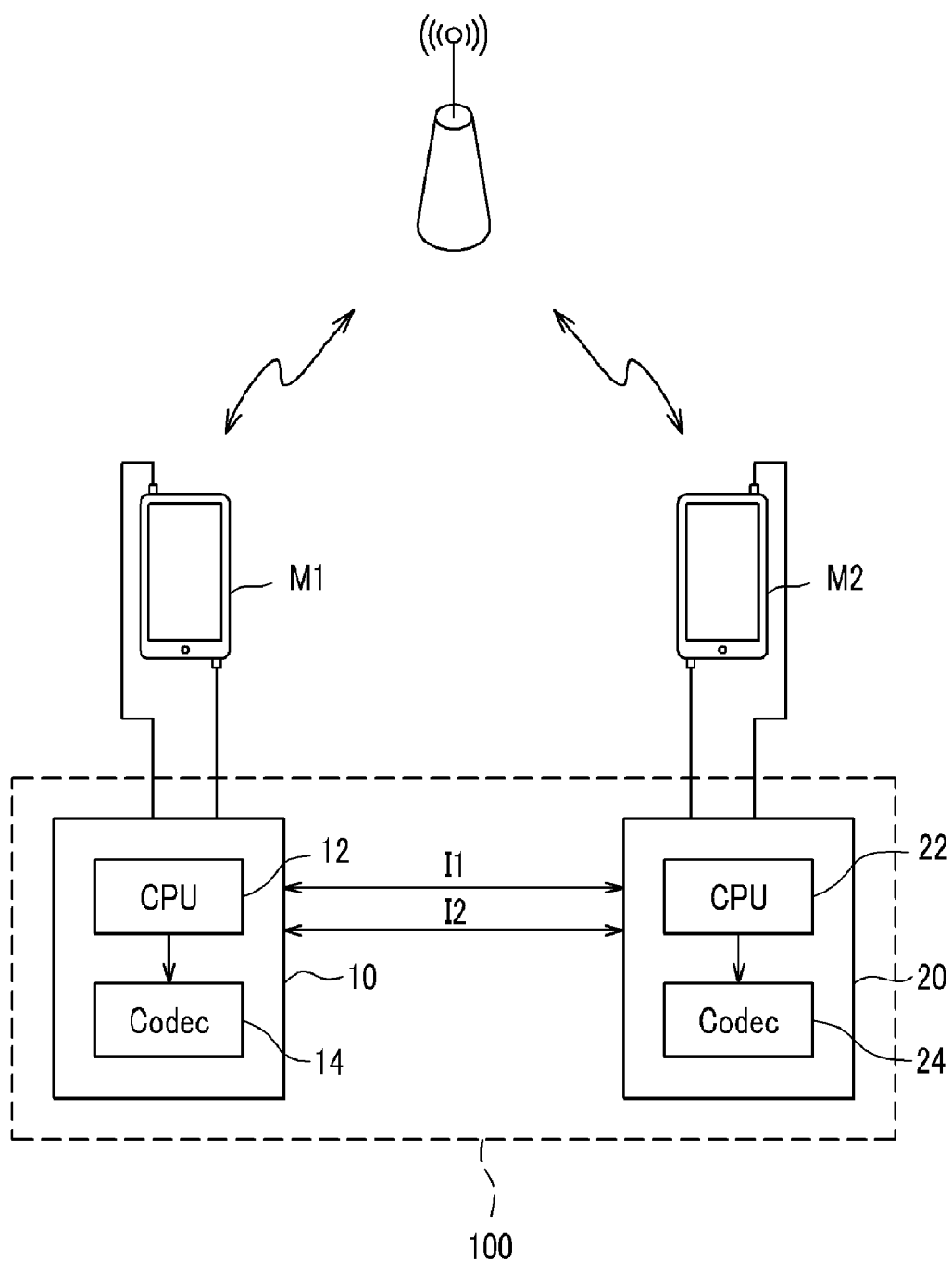
FIG. 1 is a functional block diagram of a call delay time measuring device applying a method in accordance with an embodiment of the present invention.

FIG. 1 is a functional block diagram of a call delay time measuring device applying a method in accordance with an embodiment of the present invention. As illustrated in FIG. 1, a call delay time measuring device 100, for example, a mean opinion score (MOS) measuring device, applying the method in accordance with the embodiment of the present invention has at least two ports 10 and 20 in which an original audio file, for example an original WAV file, is replayed through one port, and an audio file received through an IP network or LTE network is recorded through the other port while connecting each of mobile communication terminals M1 and M2 to the call delay time measuring device 100, and the ports 10 and 20 include CPUs 12 and 22 for a control and CODECs 14 and 24, respectively.

Meanwhile, CPUs 12 and 22 of the ports 10 and 20 are mutually connected by one or more hardware interrupt signal lines (two lines in the embodiment), that is, a ready interrupt signal line I1 and a starting interrupt signal line I2 as described below. Each of the ports 10 and 20 is also connected to a data pin and an audio jack of the mobile communication terminals M1 and M2 through a USB cable and an audio cable, respectively. In the above-described case, a host program for a control of the CODECs 14 and 24 included in each of the ports 10 and 20, that is, for a control of replaying and recording the original WAV file, is loaded in the mobile communication terminals M1 and M2.

In the above-described configuration, when one port 10 of the ports 10 and 20 becomes a replaying part and a mobile communication terminal M1 connected thereto becomes a replaying terminal, the other port 20 of the ports 10 and 20 becomes a recording part and a mobile communication terminal M2 connected thereto becomes a recording terminal Descriptions will progress using the above-described terms in the following embodiments.

Figure 2:
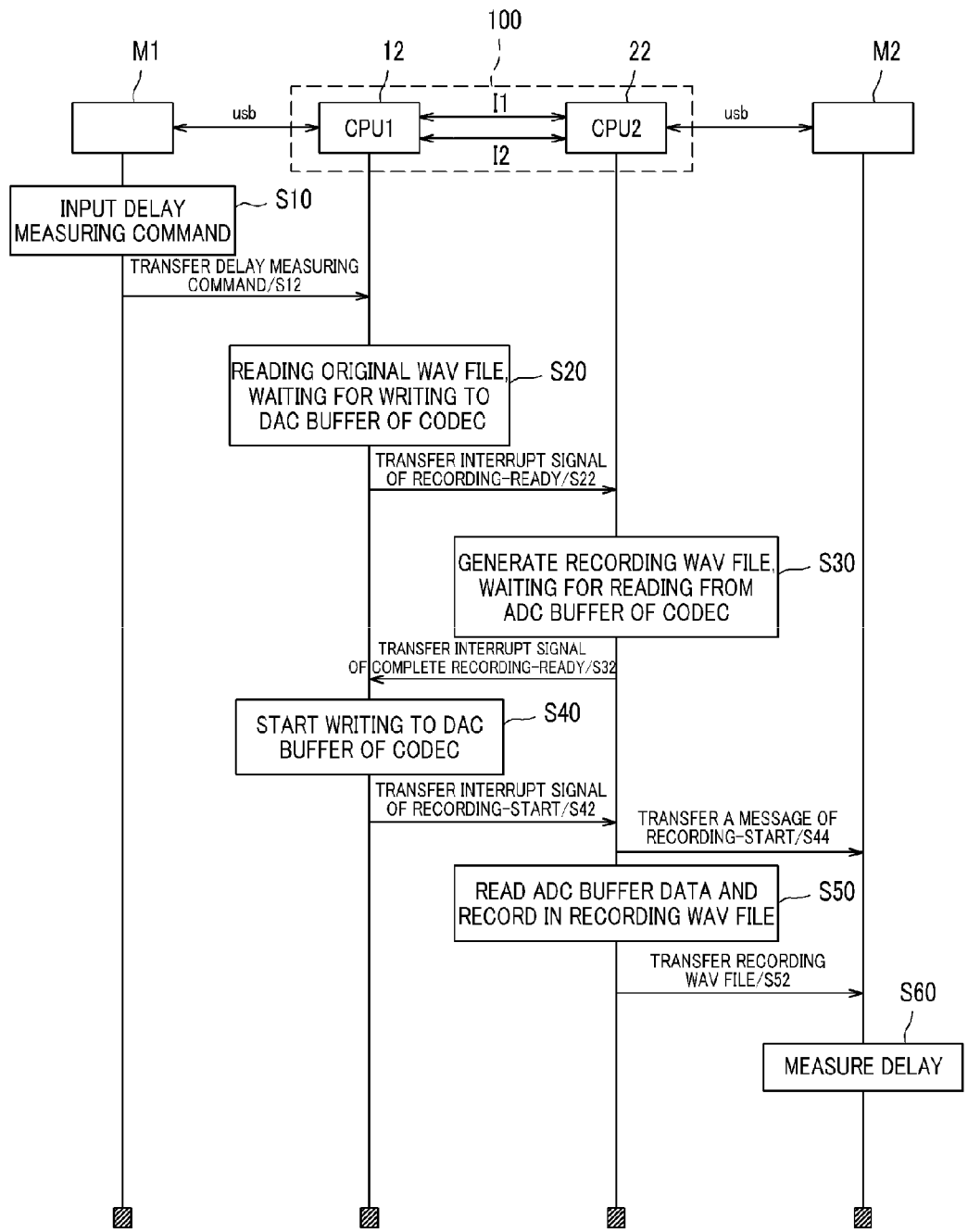
FIG. 2 is a flow chart illustrating a method of measuring a call delay time in accordance with the embodiment of the present invention.

FIG. 2 is a sequence chart illustrating a method of measuring a call delay time in accordance with the embodiment of the present invention. As illustrated in FIG. 2, in order to measure a call delay time by the call delay time measuring device 100 in accordance with the embodiment of the invention, an operator performs a host program of a replaying terminal M1 in advance.

In the above-described state, the operator inputs a delay measuring command in the host program of the replaying terminal M1 (S10), for example, manually pressing "replay button", and then the delay measuring command is transferred to a CPU 12 of a replaying part 10 (S12). Thus, the CPU 12 of the replaying part 10 reads an original WAV file stored in a memory (not shown), and waits for writing to a DAC buffer of a CODEC 14 (S20), and then transfers an interrupt signal of recording-ready to a CPU 22 of a recording part 20 through a ready interrupt signal line I1 (S22).

Next, the CPU 22 of the recording part 20 generates a recording WAV file and waits for reading from an ADC buffer of a CODEC 24 (S30), and then transfers an interrupt signal of complete recording-ready to the CPU 12 of the replaying part 10 through the ready interrupt signal line I1 (S32).

Next, the CPU 12 of the replaying part 10 records the read original WAV file to the DAC buffer of the CODEC 14 (S40) and starts replaying the original WAV file, and simultaneously transfers an interrupt signal of recording-start to the CPU 22 of recording part 20 through a starting interrupt signal line I2 (S42). Next, the CPU 22 of the recording part 20 transfers a message of recording-start to a recording terminal M2 (S44), and a recording terminal M2 uses a receiving time of the message of recording-start for measuring a call delay time later.

Meanwhile, an audio signal of the original WAV file replayed as described above is input in the replaying terminal M1 and then transferred to the recording terminal M2 through an IP network or LTE network. The recording terminal M2 transfers the received audio signal to the CODEC 24 of the recording part 20.

Next, the CPU 22 of the recording part 20 records audio data in a recording WAV file by reading the audio data from the ADC buffer of the CODEC 24 (50), and immediately transfers the recording WAV file to the recording terminal M2 after the recording is completed (S52).

Finally, the call delay time is calculated by a generated time of recording WAV file subtracted by a starting time of reading the audio data from the ADC buffer of the CODEC 24 through the host program in the recording terminal M2, that is, a received time of the message of recording-start (S60).

As described above, in accordance with the embodiment of the invention, the method of measuring the call delay time synchronizes the replaying part and the recording part using an interrupting hardware method and then measures the call delay time, thereby a measurement error is dramatically reduced and a measurement error generated from every operator or measurement can also be eliminated.

Furthermore, time spent on a ready process of replaying, that is, the ready process until recording to the DAC buffer of the CODEC 14 of reading data from the original WAV file and a ready process of recording, in other words, the ready process until reading data from the DAC buffer of the CODEC 14 of generating a recording WAV file, are excluded from the measurement of the call delay time, thereby an actual call delay time in an IP network or LTE network can be measured more accurately.

The foregoing is a detailed illustration of the method for measuring the call delay time in exemplary embodiments of the present invention and is just an example, and various transformations and modifications within the scope of the embodiment of the present invention may be possible. Therefore, the scope of the technical concept in the embodiment of the present invention is set forth by the scope of the invention defined by the appended claims.

For example, the term "CPU", regardless of the term, may be understood as referring to any other software or hardware performing an equivalent function.

What is claimed is:

1. A method of measuring a call delay time, wherein the measuring of the call delay time is performed by a call delay time measuring device including central processing units (CPUs) and coder-decoders (CODECs), connecting the CPUs with a ready interrupt signal line and a starting interrupt signal line, and having at least two ports respectively serving as a replaying part and a recording part, and the method comprises:
    reading an original WAV file when a replaying part CPU receives a delay measuring command, waiting for writing to a DAC buffer of a replaying part CODEC, and transferring an interrupt signal of recording-ready to a recording part CPU through the ready interrupt signal line;
    generating a recording WAV file by the recording part CPU, waiting for reading from an ADC buffer of a recording part CODEC, and transferring an interrupt signal of complete recording-ready to the replaying part CPU through the ready interrupt signal line;
    recording the original WAV file read by the replaying part CPU to the DAC buffer of the replaying part CODEC, replaying the original WAV file and simultaneously transmitting an interrupt signal of recording-start to the recording part CPU through the starting interrupt signal line, and
    reading audio data from the ADC buffer of the recording part CODEC by the recording part CPU and recording the audio data to the recording WAV file.

2. The method according to claim 1, wherein the delay measuring command is transferred from a host program loaded in the replaying terminal.

3. The method according to claim 1, wherein the recording part CPU receives the interrupt signal of recording-start and transfers a message of receiving the interrupt signal to the recording terminal, and the recording terminal calculates the call delay time through the host program by subtracting a received time of the message of receiving the signal from a generated time of the recording WAV file.

* * * * *